United States Patent [19]
Collard et al.

[11] 3,924,830
[45] Dec. 9, 1975

[54] SYSTEM FOR RIGIDLY FIXING AN OBJECT TO A SUPPORT BY MEANS OF THERMALLY INSULATING TENSION TIES, MORE PARTICULARLY FOR ASTRONOMICAL RADIOMETERS

[76] Inventors: Maurice A. Collard, Le Chesnay; Serge Alfred Cruchant, Bagneux; Jean-Louis Lafon, Trappes, all of France

[22] Filed: Apr. 30, 1974

[21] Appl. No.: 465,597

[30] Foreign Application Priority Data
May 4, 1973 France .............................. 73.16106

[52] U.S. Cl. .............................. 248/358 A; 248/18
[51] Int. Cl.² .......................................... F16L 15/04
[58] Field of Search .......... 248/358 A, 358 R, 18, 1; 273/73 A; 188/1 B

[56] References Cited
UNITED STATES PATENTS

| | | |
|---|---|---|
| 2,188,250 | 1/1940 | Serrano .............................. 273/73 A |
| 2,246,109 | 6/1941 | Serrano .............................. 273/73 A |
| 2,971,760 | 2/1961 | Boykin et al. ..................... 273/73 A |
| 3,043,644 | 7/1962 | Esch ........................... 248/358 A X |
| 3,204,897 | 9/1965 | Lawrence .................. 248/358 A X |
| 3,371,895 | 3/1968 | Speranza ..................... 248/358 A X |

FOREIGN PATENTS OR APPLICATIONS 654,277   1/1965   Belgium .......................... 248/358 A Primary Examiner—J. Franklin Foss
Attorney, Agent, or Firm—Wigman & Cohen

[57] ABSTRACT

A system for securing an object to a surrounding support by means of tension ties therebetween, said system offering great rigidity and low thermal conductivity between the support and the object, which object may be a radiometer plate or radiometer gear and has a median plane and a symmetry axis perpendicular thereto. The tension ties converge two by two towards points on said median plane spaced from said axis and are fixed to the support by restraining members lying in a plane parallel to said median plane.

12 Claims, 5 Drawing Figures

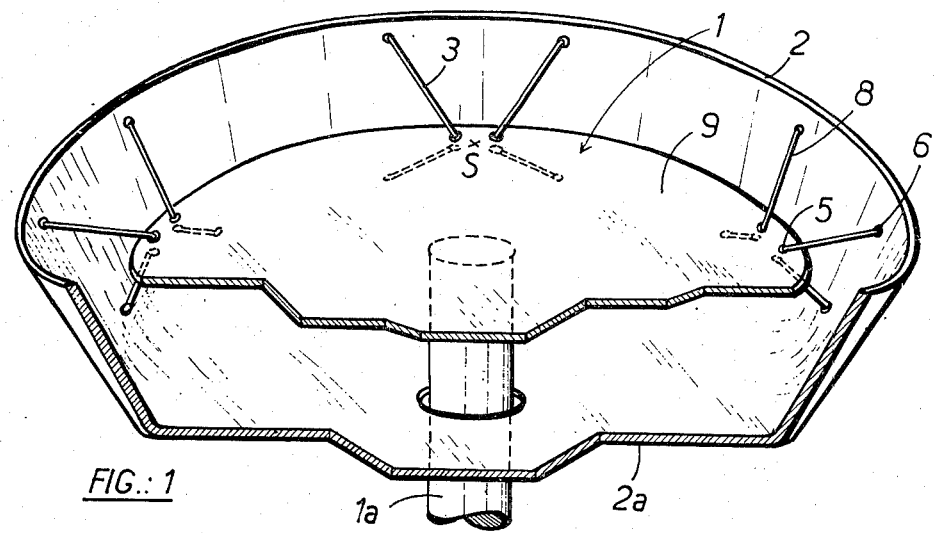
FIG.: 1
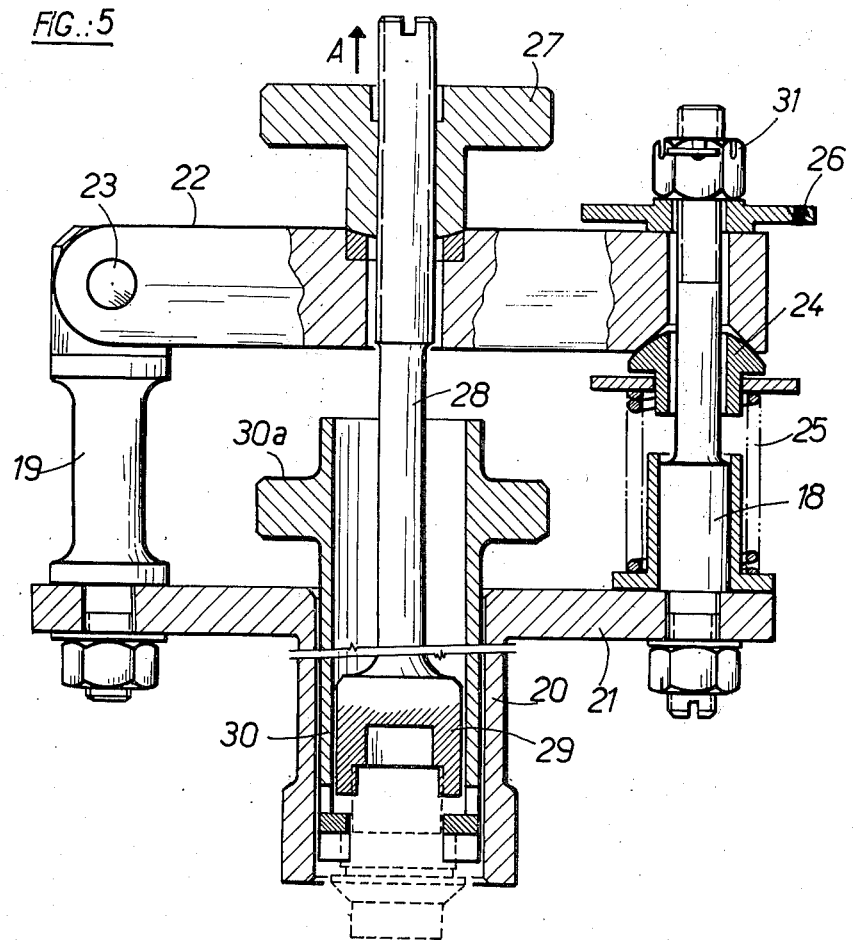
FIG.: 5

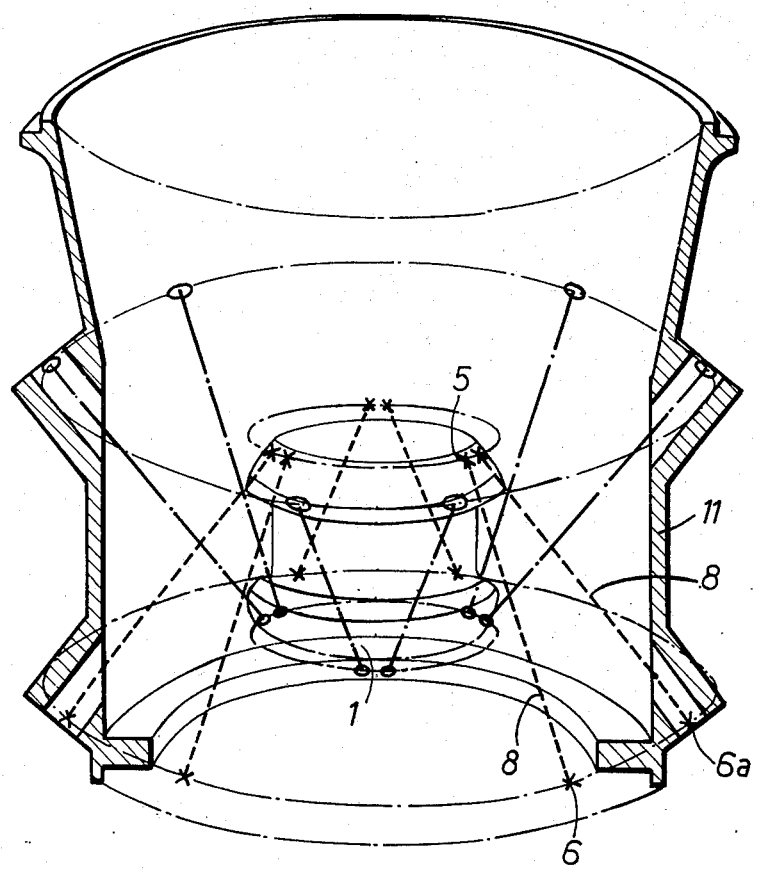
FIG.:2

SYSTEM FOR RIGIDLY FIXING AN OBJECT TO A SUPPORT BY MEANS OF THERMALLY INSULATING TENSION TIES, MORE PARTICULARLY FOR ASTRONOMICAL RADIOMETERS

The present invention, which is concerned primarily with infrared radiation measurement and was developed in collaboration with Bertin & Cie, relates to a suspension system which conducts very little heat and is sufficiently resistant to the vibration and accelerations engendered during the phase of launching a spacecraft having a device or plate the center of which must be positioned to within a few tenths of a millimeter, the whole operating at cryogenic temperatures. For examplary purposes, it is proposed to consider the suspension of a radiometer radiating element, by means of poor-heat-conducting tapes, within a surrounding coaxial support, it being necessary for the suspension system to be made rigid enough under the specified conditions, in a manner to be explained in greater detail hereinafter.

For instance, such a radiometer may be required to be launched by a rocket into interplanetary space and to be accurately pointed at the source from which radiation is to be measured.

It is particularly important in such cases to be capable of devising radiator securing means able to withstand the stresses due to the accelerations and the temperature variations. Further, such securing means must have as high as possible a natural vibration frequency in order to avoid resonances at the time of launch in those frequency bands in which excitation is maximum, yet must retain thereafter sufficient precision to permit orientation of the radiator to within better than 5 minutes of arc, say, and positioning of its center to within a few tenths of a millimeter. At the same time, it is necessary to ensure thermal insulation of such radiator, which in turn requires using a minimum number of tension ties made of a poor-heat-conducting material.

Already known are methods of insulatingly mounting an object inside one or more concentric envelopes, using interconnecting ties.

However, these known methods fail to provide satisfactory means for exactly and uniformly tensioning the different ties, or for their optimum arrangement and constitution, making it uncertain as to whether or not the system will actually be usable in practice.

Moreover, these known arrangements are unsuitable for cases where the entire system is liable to be subjected to high angular accelerations, such as an acceleration of 16 radians/sec$^2$ in the case of a certain satellite.

The present invention provides an optimum suspension system from the mechanical and thermal standpoints, by an arrangement of tension ties extending obliquely on either side of a symmetry axis of the object and its support and on either side of planes passing through that axis, and by an accurate adjustment of the tensioning forces in the tension ties.

Accordingly, in order to devise a system for fixing an object to a support surrounding it, such system being possessed of great rigidity and low thermal conductivity between said object having a symmetry axis and one or more reference planes (such as a median plane) perpendicular thereto, and said support, by means of tension ties extending between the object and the support, said tension ties are caused, in accordance with this invention, to converge substantially two by two towards points lying in a reference plane of the object spaced from the axis thereof and are connected to the object proximate said points and fixed to the support by restraining means at points lying in a circle centered upon said axis and lying in a plane parallel to said reference plane and spaced therefrom.

The invention further enables the suspended object to be lightened to a maximum by providing the restraining members and the tension adjusting means on the support, which is more readily accessible. To that end, each tie is folded back to form a loop engaging over a peg possibly formed with a restraining shoulder and welded, riveted, screwed or glued to the object. The diameter of this peg, which is very light in weight, is adapted to the degree of flexibility of the tie in order to avoid stress concentrations due to the bending thereof. From this standpoint, the optimum kind of tie is a tape made up of parallel fibers of a commercially available type, such as one made of glass fibers impregnated with hardening resin subsequent to assembly. Such tapes also lend themselves well to adjustable fixing thereof by tightening clamps forming part of the restraining members. The lightening achieved for the suspended object makes it possible to reduce the number of section of the ties, thus improving thermal insulation.

Thermal insulation is still further improved by using ties made of poor-heat-conducting, high strength materials, examples being glass fibers or fibers made of a polyamide (such as that marketed under the designation PRD 49), or fibers made of boron or titanium alloy, or the like.

In accordance with this invention, the plate is fitted by adopting a special method of adjusting the tensions in the plurality of ties or tapes for securing the plate to a concentric support. According to this method, the support is provided, at each place where a tie is fixed to it, with adjustable and latchable tie-restraining means, and each such restraining means is caused to tension each tie by the use of the same tool, which tool fits over each restraining means and embodies a calibrated spring in order to ensure that each tie exerts the same appropriate tensile force.

The description which follows with reference to the accompanying non-limitative examplary drawings will give a clear understanding of how the invention can be carried into practice.

In the drawings:

FIG. 1 is a fragmental schematic perspective illustration of a radiometer plate suspension system;

FIG. 2 is an illustration of an alternative method of arranging the ties, in cases where an annular object is to be secured, the support being shown fragmentally only;

Figure 3:
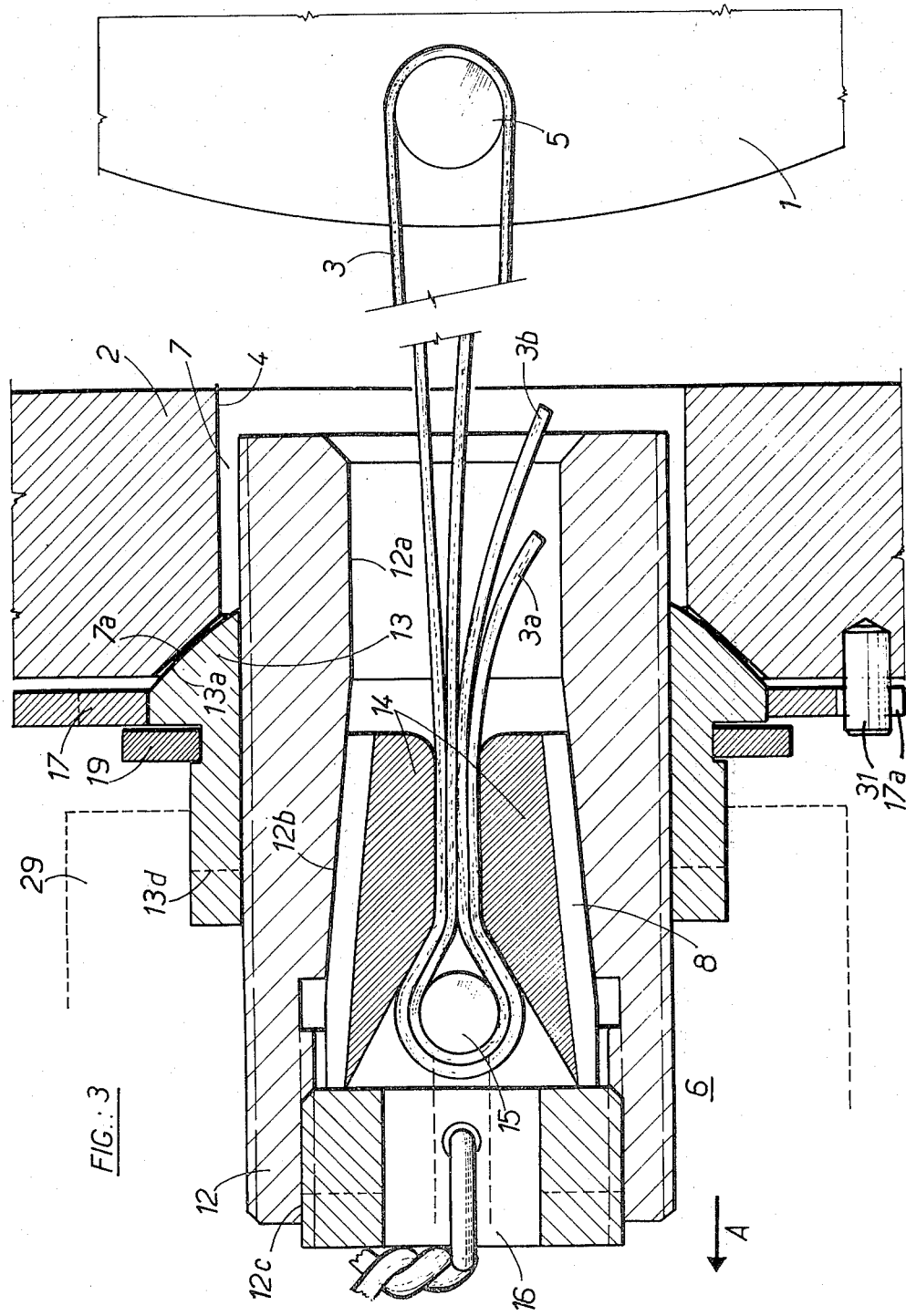
FIGS. 3 and 4 are fragmental longitudinal section and end views, respectively, of the means for tensioning the tie or tape; and, FIG. 5 shows in longitudinal axial section a tool suitable for tensioning the ties or tapes.

Referring first to FIG. 1, there is shown thereon a radiometer plate 1 suspended inside a frustoconical enclosure 2 which terminates in a surface 2a parallel to the plate and accordingly has a dish-like shape. The plate 1 bears the radiation detector on its upper surface and supports a heat-conducting central tube 1a in contact with a dioptric block underneath (not shown). Plate 1 is connected and fixed to the support 2 by six sets of ties (or tapes) 3 which form as many "pyramids," at least substantially; that is to say, there are two ties 3 positioned on either side of the plate, each having one end secured to a peg 5 on the plate and the other to an attachment (or restraining) member 6 on the cone frustrum, the two ties converging toward an imaginary vertex S. The angle included between a tie above the plate and its companion tie below is approximately 30°.

The ribbons forming the tension ties are preferably made of resin-coated glass fibers, which possess negligible thermal conductivity.

Reference is next had to FIG. 2 for a showing of an alternative method of fixing a different object 1 to a support 11 by means of ties 8, the object in this case having substantial depth instead of being a plate. The object 1 is roughly spool-shaped and is positioned coaxially within a substantially cylindro-conical supporting housing 11 formed with upper and lower securing flanges embodying openings 6a therein to receive the restraining members. Thus, provision is made for two sets of tension ties converging substantially toward an upper circle parallel to the median plane of the object and toward a lower circle parallel thereto, respectively. The ties belonging to one set thereof out across those belonging to the other set. Thus, a tie 8 joining a peg 5 at the top of the object 1 to a restraining member 6 on the lower flange cuts across an adjacent tie having its associated peg and restraining member inverted; further, the convergence points on the respective circles are appropriately offset and the restraining points appropriately arranged so as to prevent the tension ties belonging to the respective sets thereof from touching one another. It is possible in this way to provide a rigid enough securing method for an object of nonnegligible thickness.

Referring next to FIG. 3, which illustrates the manner of attachment of one of the tapes 3 connecting plate 1 to support 2, it may be seen that tape 3 forms a loop round a fixing peg 5 provided on the plate. The loop first passes loosely round a pin 15 or like fastening means in the restraining member 6, near the front part thereof. The two ends of the tape are shown at 3a and 3b.

Said restraining member includes an externally threaded bush 12 with which cooperates a nut 13 the forward plate-adjacent side of which is inclined and bulged at 13a to form a portion of a sphere, and a bore 7 is provided through the thickness of the support 2 and terminates at the rear in a bevelled face 7a adapted to cooperate with the spherical front surface of nut 13. Nut 13 is formed with dogs 13d thereon.

Roughly speaking, the interior of bush 12 is bored to form three different sections: a forward cylindrical section 12a proximate the plate; a tapering section 12b joining with section 12a and opening out rearwardly, and a counter-bored and threaded section 12c of greater diameter at the extreme rear.

Two cotter-pins 14 having the same degree of taper as the tapering section 12b are adapted to engage therein and are formed with one or more pairs of diametrically opposed grooves 8, the functions of which will be explained hereinafter. The cotter-pins jointly form a central passage which will just admit the tapes 3 there-through and which clamps them when the cotter-pins are joined together. At their rear ends, the cotter-pins 14 are bevelled internally whereby to accomodate the pin 15, which pin is slidably supported in axially extending grooves formed in bush 12 and not visible in FIG. 2.

A covering nut 16 may be screwed into bush section 12c. The nut 13 has a regular dodecagonal profile. A washer 17 has its inner periphery shaped to match and engage over the twelve-sided nut 13. A circlip 19 secures washer 17 over nut 13.

The procedure for fixing the plate to its support is to first attach all the ties or tapes and to set them under tension one after another, beginning with two diametrically opposed restraining members and continuing in the same way so as to apportion the loads as equally as possible.

The procedure for placing a tape in position is to begin by fitting it loosely, with the cotter-pins 14 outside in front of section 12c, ready to engage thereinto and supporting the pin 15. The cotter-pins are then gripped with a pair of tweezers, or the like, having jaws slim enough to engage into the longitudinal grooves 8, thereby enabling the cotter-pins 14 with the pin 15 and tapes 3 to be engaged into the bush, at the same time as the ends 3a and 3b are pulled in order to improve tightness.

The tweezers can easily be disengaged as soon as the assembly has wedged in position securely enough. During this initial phase, the nut 13 does not yet bear against the support 2.

As already stated, it is important that all the tapes be tensioned to the same appropriate extent, and to this end use is made of a tensioning tool with an incorporated calibrated spring of the kind shown in FIG. 5.

Figure 4:
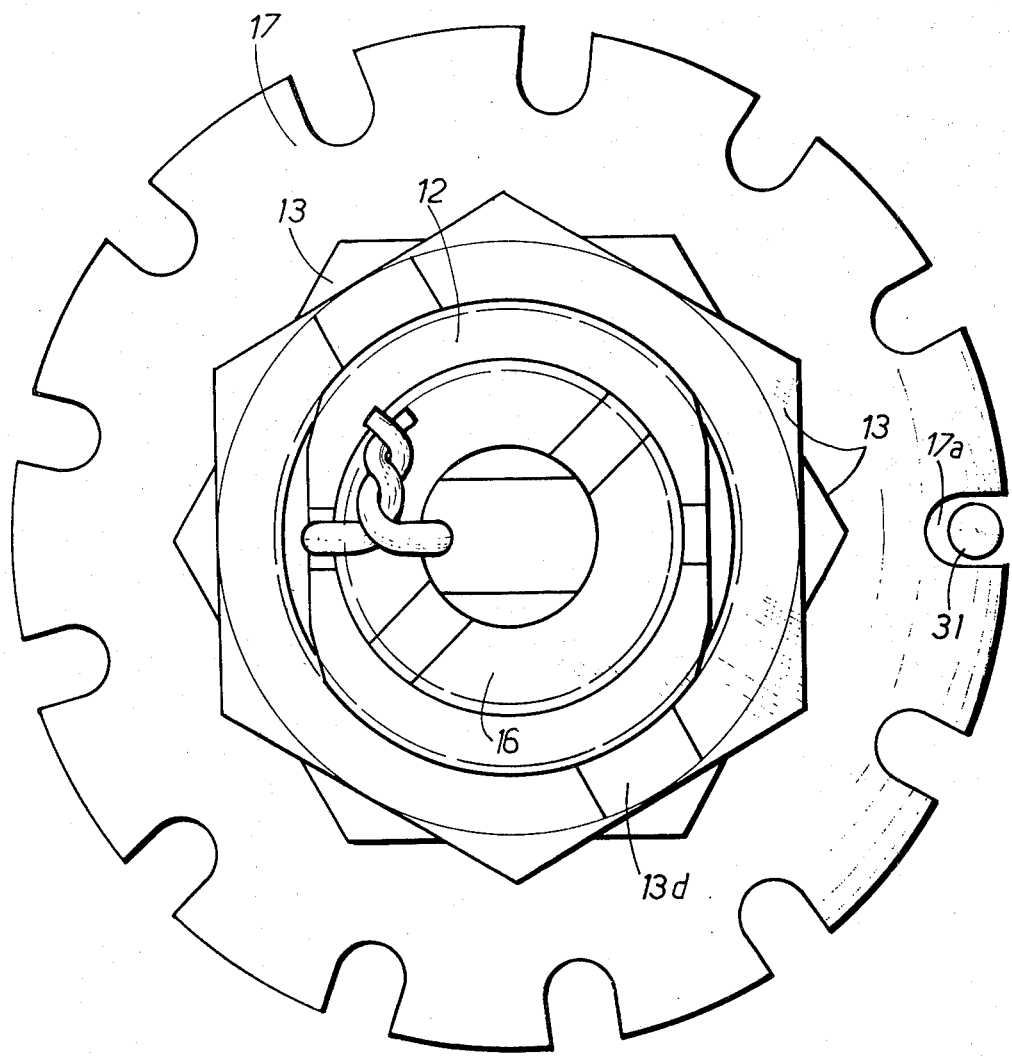

Said tool includes a base 20, which is adapted to bear against supporting cone frustum 2 by engaging over the associated restraining member (it must be realized that FIGS. 2 and 4 are drawn on different scales). Base 20 extends rearwardly to form a plate 21 which, through the agency of a pillar 19, supports a lever arm 22 fulcrumed at 23 and having its free end bearing upon a floating head 24 supported by a calibrated spring 25 and cooperating with guide means 18. The rating of spring 25 is adjustable and is set once and for all by a set-screw 26 locked by a nut 31.

A knurled nut 27 bears on lever 22 midway therealong and can be screwed by the operator over the threaded upper end of a rod 28. If nut 27 is tightened up as it thrusts against lever 22 restrained by spring 25, rod 28 tends to be shifted outwardly in the direction of arrow A. The lower end of rod 28 is formed into an actuating nut 29. The latter is adapted to engage over the outer screw-threads formed on bush 12 (FIG. 2), the position of nut 27 having been adjusted beforehand accordingly.

Thus, if the operator tightens up nut 27 he causes the bush 12 and, with it, the restraining assembly with the tape loop 3, to be drawn in the direction A, thereby setting the restraining member under tension until spring 25 is compressed, which spring is preloaded beforehand to an extent equal to one-half the tension considered appropriate for the tape, using a knurled set-screw 26 for the purpose. So long as screw 25 is not compressed, set-screw 26 cannot lift off lever 22, being held thereagainst by spring 25, but as soon as the latter is compressed slightly, set-screw 26 begins to float. This can be felt by the operator, who is thus appraised of the fact that the required tension has been reached.

At this stage, the process of screwing up set-screw 27 is arrested and the "key" 30 is rotated with the help of dogs 30a. Key 30 consists of a tube placed between parts 20 and 29 and formed for example with two terminal diametrically opposed slots which engage with matching projections 13d formed on the nut 13 so as to fetch the same into abutment against supporting cone-frustum 2.

The tensioning tool is then withdrawn and nut 13 is locked or restrained by fitting the restaining washer 17, which washer is retained by circlip 19 and embodies a slot 17a engaging with a locking peg 31 fast with support 2.

It is to be noted that the advantage of having the spherical thrust surface of nut 13 cooperate with the conical thrust surface formed in support 2 is that it ensures correct centering even when the thrusting force is not rigorously perpendicular.

The tensioning operation is performed on each tape, and the tension is preferably selected outside the range of tensions liable to produce dangerous resonance in the system.

Once a tape has been tensioned, but preferably after all of them have been tensioned, the unnecessary projecting ends 3a and 3b are cut off.

The above-described fitting and tension-adjusting operations presuppose that the object and its support have been positioned beforehand through the agency of rigid and removable equipment, as is customary in such operations, for instance through the agency of a part of revolution machined with a flange thereon for engaging over the support, and a shaft which engages without clearance into a bore formed in the object. Tests have shown that application of the present invention allows of abtaining positioning tolerances of the order of a few tenths of a millimiter, and better than to within five minutes of angle, after the positioning equipment has been removed and even after vibration tests have been conducted.

It goes without saying that changes and substitutions of parts may be made in the forms of embodiment hereinbefore described without departing from the scope of the invention.

We claim:

1. A system for securing an object, which is revolution-shaped around an axis, to a surrounding, coaxial support, said object being moreover symmetrical with respect to a reference median plane perpendicular to said axis, said system comprising individual tension ties formed in groups of four ties which each include two pairs of tension ties that are symmetrical to each other with respect to said reference plane, each tension tie connecting an anchorage point on the object to an anchorage point on the support, the anchorage points of one pair on the object being spaced and the anchorage points of the same one pair on the support being also spaced, but by a greater distance than the former anchorage points, said groups of four tension ties being equally distributed around said axis.

2. A system as claimed in claim 1, wherein one anchorage point of every tie is provided with an actuatable member for adjusting the tension of the corresponding tie.

3. A system for securing an object, which is revolution-shaped around an axis, to a surrounding, coaxial support, said object being moreover symmetrical with respect to a reference median plane perpendicular to said axis, said system comprising two series of individual tension ties which each connect an anchorage point on the object, situated on one side of the reference plane, to an anchorage point on the support situated on the side of the reference plane which is opposite to said one side, every two tension ties of one series corresponding to two tension ties of the other series so as to present symmetrical tilts with respect to the axis and to point inwards in a convergent manner, the anchorage points on the object being less spaced than the anchorage points on the support.

4. A system as claimed in claim 3, wherein one anchorage point of every tie is provided with an actuatable member for adjusting the tension of the corresponding tie.

5. A system for securing an object having a symmetry axis to a surrounding support, which comprises fixing means on the object and corresponding restraining means on the support, tensioned ties for individually connecting every fixing means to a corresponding restraining means, said ties forming a number of pairs in which two ties make an angle comprised between 30° and 60°, all the planes of the pairs being tilted with respect to the symmetry axis of the object with an angle comprised between 30° and 60°, said pairs being equally distributed around said axis, each restraining means being associated with an adjusting device for adjusting the individual tension of every corresponding tie, each tie being made of a material having very low heat conduction and great tensile strength.

6. A system as claimed in claim 5, in which said pairs of ties include two sets of practically converging pairs which are oppositely tilted with respect to the axis, every pair of one set being associated with a pair of the other set so as to form a pyramid whose edges are formed by the ties and whose apex is directed towards the axis.

7. A system as claimed in claim 5, in which the tension ties are made of fiber tapes and in which the restraining means include clamping members for clamping said tapes.

8. A system for securing an object to a surrounding support, which object has a symmetry axis and one or more reference planes such as a median plane perpendicular thereto, by means of tension ties extending between the object and the support that converge substantially two by two towards points lying in a reference plane of the said object and spaced from the axis thereof and which are connected to said object proximate said points and fixed to said supports by restraining members at points lying in a circle centered upon said axis and located in a plane parallel to said reference plane and spaced therefrom, said restraining member including a hollow bush formed with an at least partly tapering bore, a pair of cotter-pins which, when applied against each other, form a passageway therethrough for the tape or tension tie to be set under tension and which are adapted to engage into the tapering bore of said bush, a tape fastening member adapted to seat into said cotter-pins at the end thereof remote from the end through which the tape enters, and means for locking the position of the restraining member on said support.

9. A system for securing an object to a surrounding support, which object has a symmetry axis and one or more reference planes such as a median plane perpendicular thereto, by means of tension ties extending between the object and the support that converge substantially two by two toward points lying in a reference plane of the said object and spaced from the axis thereof and which are connected to said object proximate said points and fixed to said supports by restraining members at points lying in a circle centered upon said axis and located in a plane parallel to said reference plane and spaced therefrom, each tension tie being looped back around a peg carried by said object, the two looped-back strands of the tension tie extending through an opening formed in said support and cooperating with a specific restraining member associated to said opening.

10. A method of adjusting the tensions in a plurality of tension ties of a system for securing an object to a surrounding support, which object has a symmetry axis and one or more reference planes such as a median plane perpendicular thereto, by means of tension ties extending between the object and the support that converge substantially two by two toward points lying in a reference plane of the said object and spaced from the axis thereof and which are connected to said object proximate said points and fixed to said supports by restraining members at points lying in a circle centered upon said axis and located in a plane parallel to said reference plane and spaced therefrom, comprising successively applying a single tensioning tool of light weight on each restraining member to adjust the tension thereon, said tool comprising a calibrated spring for applying the same force to each tension tie.

11. A method as claimed in claim 9, in which said spring in the tool is calibrated so as to apply a force corresponding to a degree of tension in the tension tie lying outside the spectrum of resonances detrimental to said object and its ancillaries.

12. A method as claimed in claim 10, in which said tool includes means enabling an operator to ascertain that the required securing tension has been reached and to thereafter lock the restraining member.

* * * * *

UNITED STATES PATENT OFFICE
CERTIFICATE OF CORRECTION

PATENT NO. : 3,924,830
DATED : December 9, 1975
INVENTOR(S) : Maurice A. Collard et al It is certified that error appears in the above-identified patent and that said Letters Patent are hereby corrected as shown below:

In the heading of the patent document, please insert the name and address of the assignee as follows:

--Centre National D'Etudes Spatiales, Paris, France--;

Column 3, line 23, change "out" to --cut--.

Signed and Sealed this twenty-third Day of March 1976

[SEAL]

Attest:

RUTH C. MASON
*Attesting Officer*

C. MARSHALL DANN
*Commissioner of Patents and Trademarks*